United States Patent [19]
Schultz et al.

[11] Patent Number: 6,129,408
[45] Date of Patent: Oct. 10, 2000

[54] TAILORED SNOWMOBILE COVER WITH DOUBLE RECEPTACLES TO TRAP WATER, SNOW, ICE AND DIRT

[75] Inventors: Jeffrey A. Schultz, Minneapolis; Michael J Kennedy, Brooklyn Park, both of Minn.

[73] Assignee: Advanced Textile Concepts, Inc., St. Paul, Minn.

[21] Appl. No.: 09/187,909

[22] Filed: Nov. 6, 1998

[51] Int. Cl.[7] .................................................. B60J 7/20
[52] U.S. Cl. ........................ 296/136; 150/166; 280/770
[58] Field of Search ........................... 296/136; 150/166; 280/770

[56] References Cited

U.S. PATENT DOCUMENTS

| | | |
|---|---|---|
| D. 288,419 | 2/1987 | Read et al. . |
| 3,603,419 | 9/1971 | Riddle ..................................... 296/136 |
| 3,884,523 | 5/1975 | Allen ....................................... 296/136 |
| 5,052,738 | 10/1991 | Li ............................................ 296/136 |
| 5,217,275 | 6/1993 | Ridge ..................................... 296/136 |
| 5,282,502 | 2/1994 | Ballard ................................... 296/136 |
| 5,445,200 | 8/1995 | Celestino et al. ...................... 296/136 |
| 5,458,945 | 10/1995 | Tall . |
| 5,562,139 | 10/1996 | Cseri ...................................... 296/136 |
| 5,564,358 | 10/1996 | Newton .................................. 150/166 |
| 5,653,492 | 8/1997 | Mills . |
| 5,662,372 | 9/1997 | Lubkeman ............................. 296/136 |
| 5,673,961 | 10/1997 | Mazzarelli ............................. 296/136 |
| 5,725,933 | 3/1998 | Nishiyama . |
| 5,746,364 | 5/1998 | Stengrim . |
| 5,813,360 | 9/1998 | Dickey ................................... 150/166 |
| 5,997,071 | 12/1999 | Mazzarelli ............................. 296/136 |

OTHER PUBLICATIONS

Dennis Kirk., "Snowmobile '98 Catalog," (1998), p. 56–63, 289, Rush City, Minnesota, USA.

Primary Examiner—Joseph D. Pape
Assistant Examiner—Kiran Patel

[57] ABSTRACT

A snowmobile cover with first and second receptacles for trapping water, snow, ice and dirt. The first receptacle is the cover as a whole wherein the cover forms a bowl like shape via an elastic cord housed in an endless sheath formed by and about the perimeter of the cover. As the cover is taken off the snowmobile, the cover is turned inside out, forming the bowl shape for containing the water, snow, ice and dirt. A second receptacle is a built in carrying bag for the receptacle. The cover (whether or not turned inside out) is rolled up into a bundle and the bundle is tucked inside of the bag for storage. If desired, water, snow, ice and dirt on the outside of the cover (or on the inside of the cover turned inside out) is also rolled up with the cover and retained within the built in bag. At a convenient location, instead of in the snowmobile trailer or in the garage, or when the snowmobiler has more time or is at a warmer location, the cover may be unraveled and turned right side out and shaken to clean the cover of melted snow and dirt. The cover further has a relatively large opening for the handlebars of the snowmobile to permit unrestricted access to the gas tank, controls and compartments. The cover further is tailored to fit the lines of a snowmobile by the inclusion of a relatively snug fit for the front of the machine, a relatively snug fit for the rear of the machine, and a tent like fit for the middle of the machine having protruding handlebars and windshield, where the tent like portion is later pinched down by a bungee cord.

20 Claims, 4 Drawing Sheets

TAILORED SNOWMOBILE COVER WITH DOUBLE RECEPTACLES TO TRAP WATER, SNOW, ICE AND DIRT

BACKGROUND OF THE INVENTION

The present invention relates to covers for vehicles and, more specifically, to covers for snowmobiles.

Snowmobiles are hardy vehicles made to withstand the elements of winter. Yet all vehicles are susceptible to the expansion powers of water freezing, to repeated freezing and thawing of water and ice, to the dents and dings made by stones being thrown up by the tires of tractor-trailer rigs passing the snowmobile being towed, or to scratches made by equipment, such as camping equipment, being stored with the snowmobile.

SUMMARY OF THE INVENTION

A feature of the present invention is a cover for the entire length and width of a snowmobile.

Another feature of the present invention is a first receptacle for trapping water, snow, ice and dirt. This first receptacle is the cover as a whole wherein the cover forms the shape of a receptacle via an expandable and retractable perimeter that is biased toward the retracted position. The first step to trapping water, snow, ice and dirt is to turn the cover inside out while taking the cover off the snowmobile. Turning the cover inside out is accomplished by expanding the perimeter, or more specifically stretching the elastic cord housed in the perimeter, about the cover as a whole as the perimeter is lifted upwardly and off the snowmobile. When the cover is turned inside out, the first receptacle is formed.

Another feature of the present invention is a second receptacle for trapping the water, snow, ice, and dirt. This second receptacle is a built in bag for the snowmobile cover. The cover may be rolled up, and water, snow, ice and dirt may be rolled up with the cover, and then tucked inside of the bag. At a subsequent time, the cover may be taken out and cleaned and permitted to dry.

Another feature of the present invention is that outside faces of the built in bag form portions of the inside face of the cover. Hence an outside face of the cover having the water, snow, ice and dirt may be rolled up onto itself to trap the water, snow, ice and dirt therein, leaving portions of the inside face of the cover to wrap around the water, snow, ice and dirt. Further, the inside face of the cover is clean so that the cover, now in bag form, may be stored even in the passenger compartment of a vehicle.

Another feature of the present invention is the provision of an endless elastic cord housed in a sheath formed about the perimeter of the sheeting. The endless elastic cord is relatively strongly biased to draw the perimeter inwardly towards itself to keep the cover in a closed position and in a position biased towards the closed position.

Another feature of the invention is a relatively large opening for the handlebars of the snowmobile. The opening is oversized and permits access to the gas tank and to controls and compartments as well as permitting the handlebars to extend through the opening. The opening is preferably sufficiently wide to extend at least to the outer ends of the handlebars.

Another feature of the present invention is that the cover is tailored to fit the sleek lines of the snowmobile. Besides being a more attractive cover when so tailored, the close fitting cover is actually less likely to tear. Since the cover form fits, excessively loose portions are minimized that might otherwise catch and rip on other objects or be blown up and torn by the wind, and excessively tight portions are minimized that may otherwise rip under such a tight stretching or damage portions of the snowmobile against which the stretching applies too much pressure.

Another feature of the present invention is that the cover includes a portion tailored to fit the hood, another portion tailored to fit the seat, and a tent like portion to extend relatively loosely over the protruding windshield and handlebars until such loose portion is drawn down by a connector such as a bungee cord.

An advantage of the present invention is cleanliness. Water, snow, ice and dirt on the outside of the snowmobile cover may be caught when the cover is turned inside out and caught again when the cover is rolled up into the built in bag. Snow or ice may melt when in the bag, and such water is then retained in the bag, instead of running off to soil a undesired surface. Ice, especially in severe conditions, rips fabric or takes the fabric along with it when the ice is directly removed from fabric. When permitted to melt, however, ice harmlessly "removes itself" from fabric and stays in the bag. The outside of the surface of the bag stays relatively clean, since such is the inner surface of the cover when the sheeting is on the snowmobile.

Another advantage is convenience. The cover, when in the form of a bag, is relatively small and compact. This is important especially for the camping snowmobiler, who may store his or her gear in compartments in the snowmobile or in a trailing unit having its own skis. The camper may place the cover over his or her snowmobile at night, shake off the snow in the morning, roll the cover up into the built in bag, store the bag having an outside clean surface in the snowmobile or trailer, and then take off to his or her next destination.

Another advantage of the present invention is that it is inexpensive. The cover is especially inexpensive when considered in relation to the expensive snowmobile it protects. A snowmobile generally includes an attractive shell with expensive graphics.

Another advantage of the present invention is that it is simple to use. The cover can be easily rolled up onto the inside surfaces of the bag. Then the bag is zippered shut.

Another advantage is that the snowmobile may be serviced with the cover generally engaged over the snowmobile. Gas may be added through the relatively large handlebar opening. Controls and compartments may be accessed through the relatively large handlebar opening.

DESCRIPTION

Figure 1:
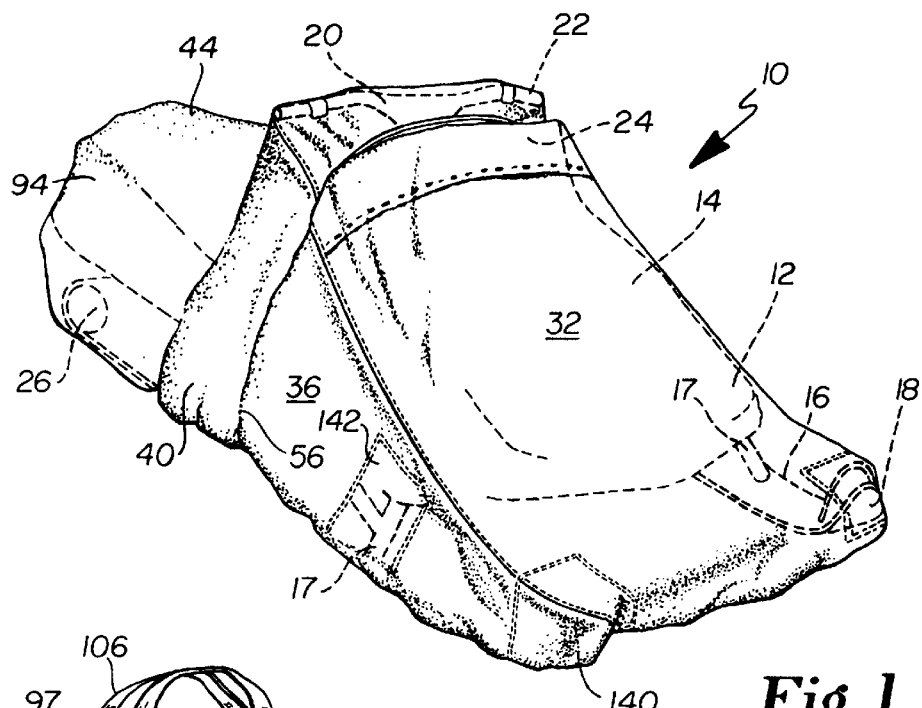
FIG. 1 is a perspective view and shows the cover of the present invention on a snowmobile.
Figure 2:
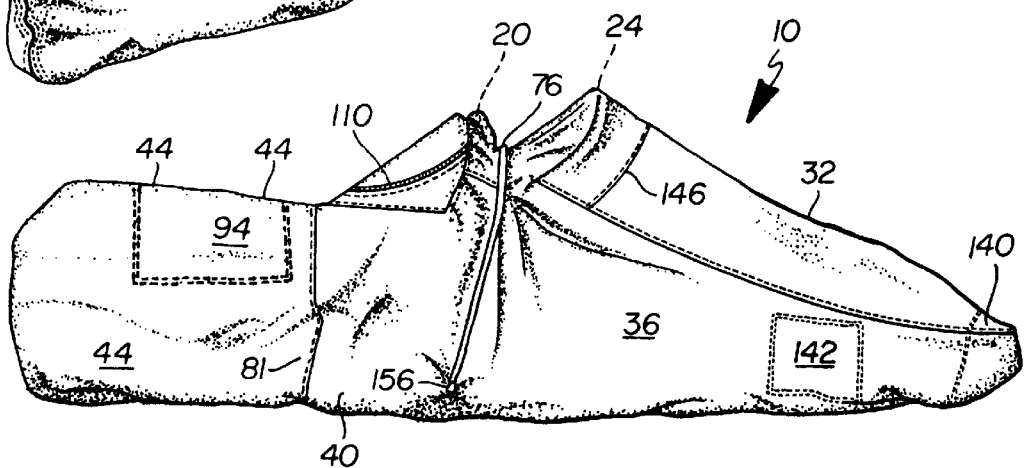
FIG. 2 is a side elevation view of the cover of FIG. 1 on a snowmobile.

As shown in FIGS. 1 and 2, the present cover is indicated in general by the reference numeral 10. The cover 10 fits over the entire length and width of a snowmobile 12. The snowmobile 12 includes an engine compartment 14, skis 16 having struts 17 and tips 18, handlebars 20 having outer ends or handles 22, a windshield 24, and a belt 26 for biting into snow.

Figure 4:
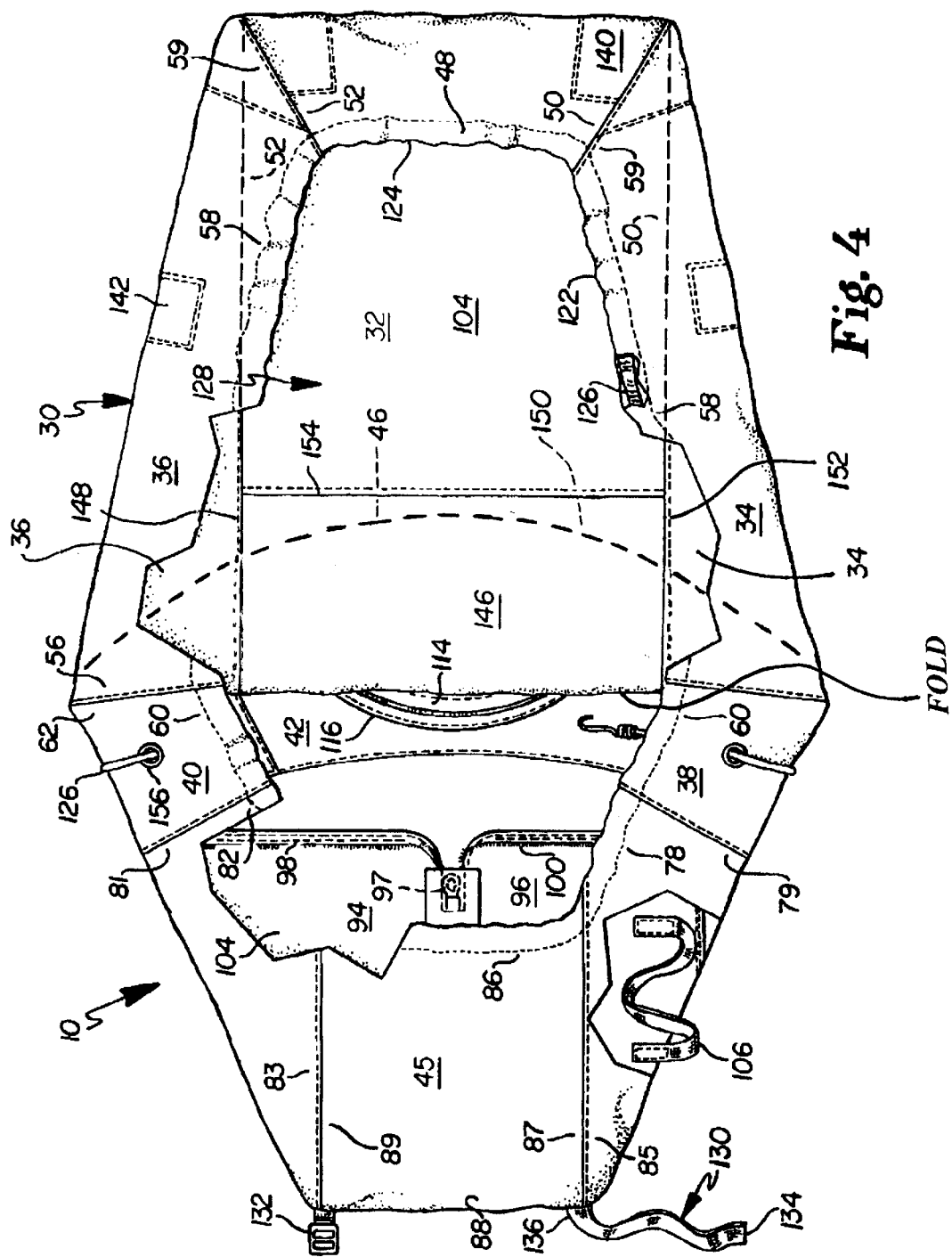
FIG. 4 shows a bottom, partially broken away view of the present cover laying on a generally flat surface and illustrates the bowl like or receptacle shape of the cover as a whole; when turned inside out, the same bowl like or receptacle shape is formed; a "tent" portion of the cover is folded along the line indicated.
Figure 5:
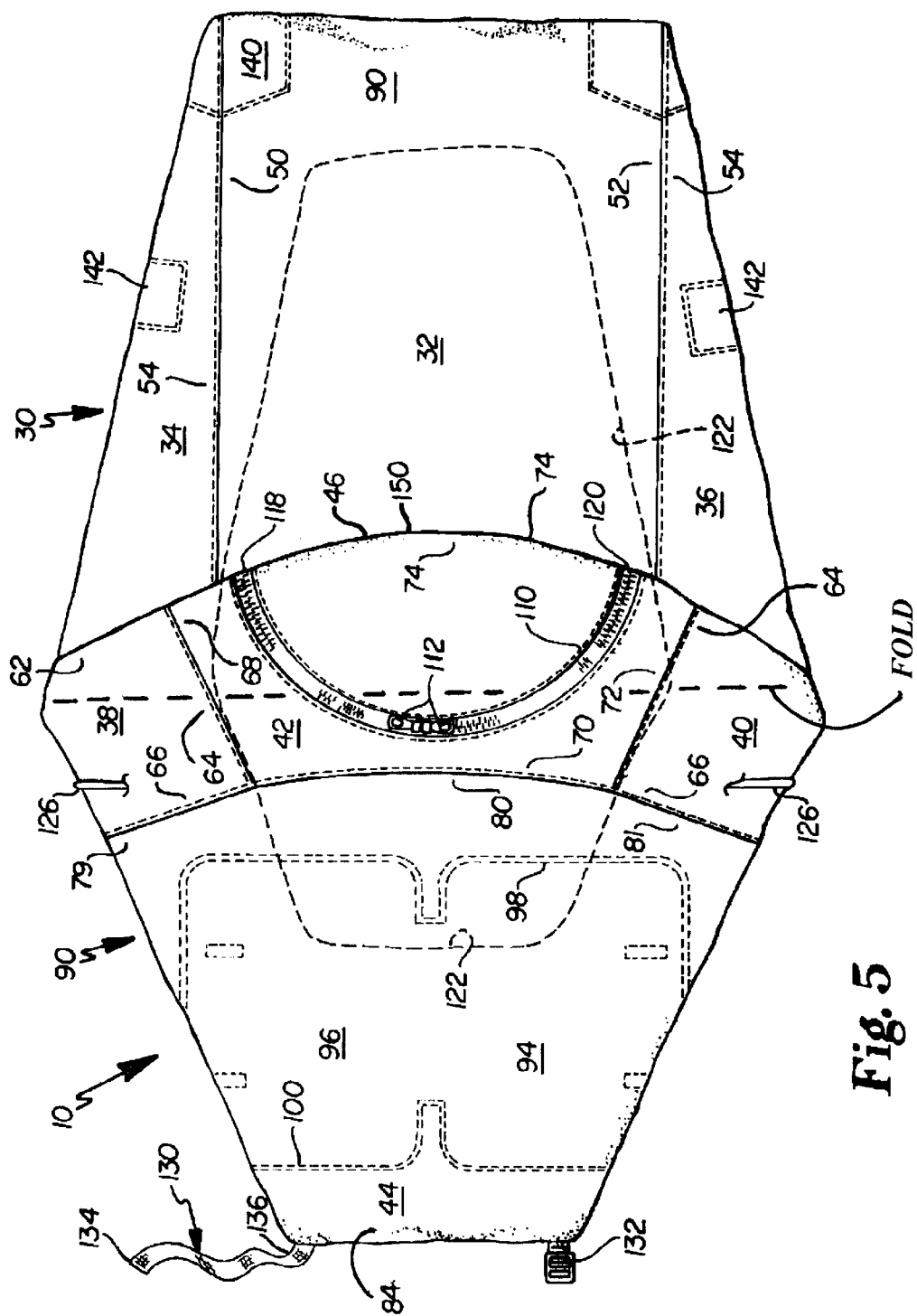
FIG. 5 shows a top view of the present cover of FIG. 4 with the cover laying on a generally flat surface; a "tent" portion of the cover is folded along the line indicated.
Figure 6:
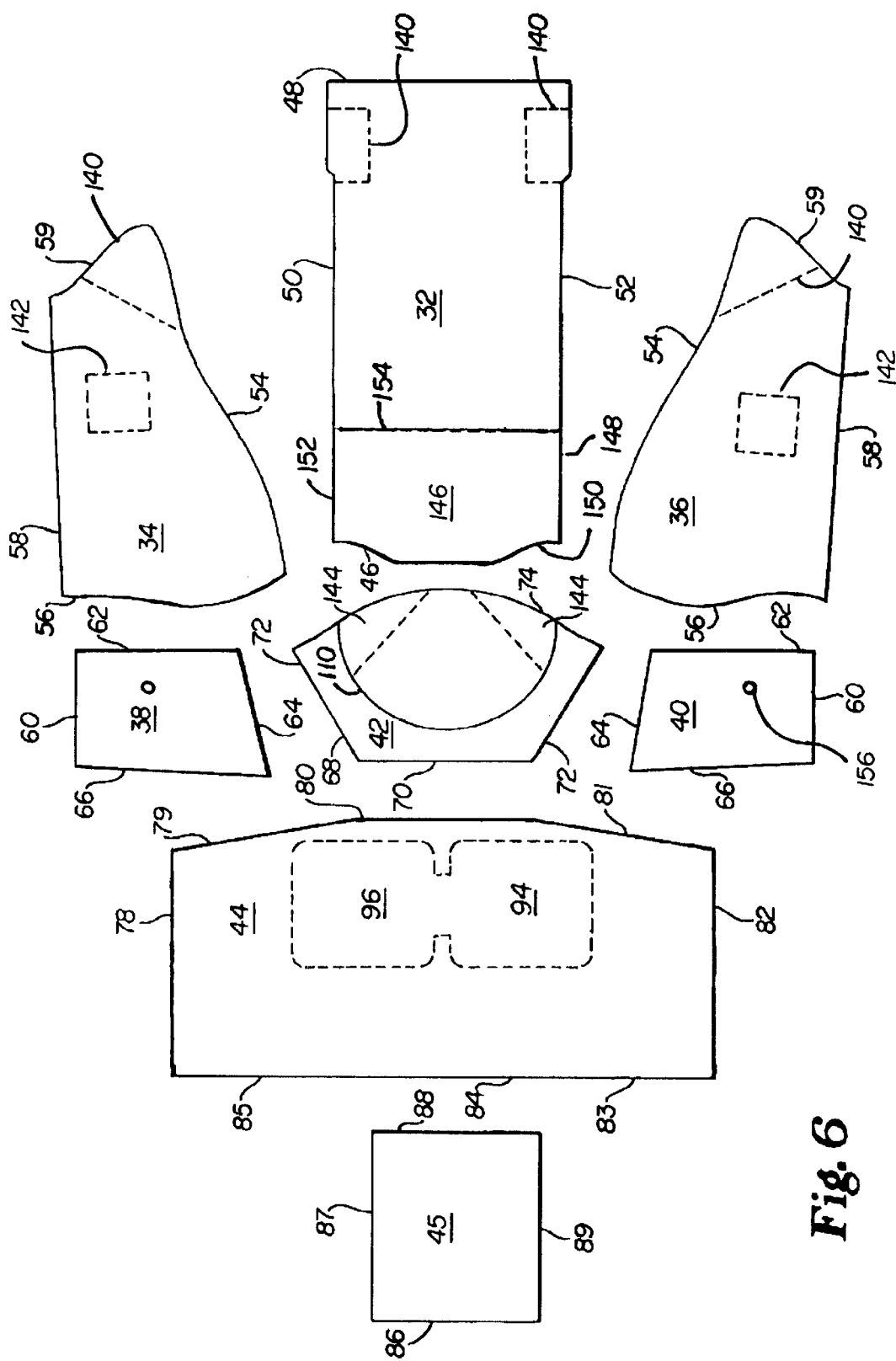
FIG. 6 shows a top exploded view of the sheeting panels or portions of the present cover of FIGS. 1–5.

As shown in FIGS. 4, 5 and 6, the cover 10 includes a sheeting 30 having seven sheeting panels or portions 32, 34, 36, 38, 40, 42, 44, and 45 stitched together. Sheeting portion 32 is a hood portion for generally covering the hood of the snowmobile 10 (or the upper part of the engine compartment 14). Sheeting portion 32 extends generally from the handlebars 22, over the windshield 24, over the engine compartment 14 to the ski tips 18. Hood portion 32 is generally a four sided sheeting portion and includes four edge portions 46, 48, 50, and 52. Edge portion 46 is undulating or curvilinear. Edge portion 46 preferably has a sufficient length to extend the length (distance from side to side) of the handlebars 20. About the rear one-third of panel 32 extends from the handlebars 22 to the base of the windshield 24, and about the remaining two-thirds of panel 32 extends along the hood or engine compartment 14 to the ski tips 18. Edge portion 48 forms a portion of the perimeter or perimeter edge of cover 10. Edge portions 50 and 52 define a width of the panel 32 and such width is preferably sufficient to extend over the handlebars 20 and windshield 24.

Sheeting portions 34 and 36 are side portions for covering the sides of the engine compartment 14 and for further extending to the ski tips 18. Each of the engine side sheeting portions 34 and 36 is generally four sided and includes four edge portions 54, 56, 58 and 59. Edge portion 58 forms a portion of the perimeter or perimeter edge of cover 10. Edge portions 54 and 59 are stitched to respective edge portions 52 and 50 of hood sheeting portion 32. Edge portions 54 and 56 are undulating. When on the snowmobile 10, edge portions 56 and 59 run generally vertically.

Sheeting portions 38 and 40 cover medial side portions of the snowmobile 10 about the handlebar 20. Each of the medial side sheeting portions 38, 40 is generally four sided and includes four edge portions 60, 62, 64, and 66. Edge portions 60 form a portion of the perimeter or perimeter edge of the cover 10. Edge portion 62 is stitched to a section of its respective edge portion 56 of engine side sheeting portion 34, 36.

Sheeting portion 42 is an interior sheeting portion for covering the handlebar 20 and portions of the snowmobile 10 disposed immediately rearwardly of the handlebar 20. Interior sheeting portion 42 is generally four sided and includes four edge portions 68, 70, 72, and 74. Edge portions 68 and 72 are stitched to respective edge portions 64 of respective side sheeting portions 38 and 40. Edge portion 74 is stitched to edge portion 46 of hood sheeting portion 32 and to a section of its respective edge portion 56 of its respective panel 34 or 36. Edge portion 74 is rounded in a general elliptical or football shape.

It should be noted that side sheeting portions 38 and 40 and interior sheeting portion 42 make up a relatively loose billowing portion or tent portion of the cover 10. Sheeting portions 38 and 40 make up two sides of the tent and the interior sheeting portion 42 make up a ceiling of the tent. Rear portions (such as about one third portions) of panels 32, 34 and 36 also make up a part of this tent. (Rear portion of panel 32 is defined by reinforcement panel 146). The formation of such a tent permits protrusions such as the windshield 24 and handlebars 20, of which there are a great variety of types and sizes, to be received therein. The tent, or loose fitting portions 38, 40 and 42 are held down via a bungee or elastic cord or resilient element 76, shown in FIG. 2. Hooked ends of the bungee cord 76 are affixed to frame portions of the snowmobile 10 via the bungee or elastic cord 76 running through grommets 156 fixed in panels 40. The cord 76 is preferably extends between the windshield 24 and handlebar 20. The cord 76 prevents a billowing of the cover 10 at the tent portion.

Sheeting portion 44 is a seat portion for the seat of the snowmobile 10. Seat sheeting portion 44 preferably includes eight sides so as to include eight edge portions 78, 79, 80, 81, 82, 83, 84, and 85. Edge portions 78 and 82 form a portion of the perimeter or perimeter edge of cover 10. Edge portions 79 and 81 are stitched to edge portions 66 of their respective medial side sheeting portions 38, 40. Edge portion 80 is stitched to edge portion 70 of interior sheeting portion 42. Edge portions 83, 84 and 85 are generally aligned with each other.

It can be appreciated that the cut provided by edges or edge portions 79, 80, 81 provide a transition into the tent or billowing middle portion of the cover 10. Likewise, the undulating edges 54 of panels 34, 36 provide a transition from the other end of the cover 10 into the tent portion of the middle of the cover 10.

Sheeting portion 45 covers a rear end of the snowmobile 12. Rear end sheeting portion 45 is four sided and includes four edge portions 86, 87, 88 and 89. Edge portion 86 forms a portion of the perimeter or perimeter edge of cover 10. Edge portions 87 and 89 are stitched to respective edge portions 83 and 85 of seat sheeting portion 44. Edge portion 88 is stitched to edge portion 84 of seat sheeting portion 44.

About the front two thirds of sheeting portions 32, 34 and 36 generally snugly cover the engine compartment 14 of the snowmobile 12 and make up one unit or one general portion of sheeting 30. Sheeting portions 38, 40 and 42 and about the rear one third of sheeting panels 32, 34 and 36 make up another unit or another general portion of the sheeting 30. Sheeting portions 44 and 45, for generally snugly covering the seat of the snowmobile, make up still another unit or general portion of such sheeting 30.

Sheeting 30 is preferably a fabric material which is soft and pliable at temperatures between about minus 30 degrees F. and about 150 degrees F. (or the temperature of metal heated by the sun). Sheeting 30 is more preferably a cotton fabric and is most preferably formed of a 100% cotton material such as a ballistic 10.10 Army canvas duck material. Yet more preferably, sheeting 30 is moisture resistant, such as being resistant to the leakage of water. Still more preferably, sheeting 30 is waterproof The preferred way to treat the sheeting 30 to render such waterproof is to apply a waterproofing polymer or copolymer to an outer face or outer surface 90 of the sheeting 30. Preferably, such a polymer is silicone. Preferably, such a polymer is also applied to the stitching of cover 10 to render the cover 10 as a whole waterproof Sheeting 30 still more preferably is resistant to ultraviolet rays. Even more preferably sheeting 30 is mold resistant.

Stitching for engaging together sheeting portions 32, 34, 36, 38, 40, 42, 44 and 45 is preferably a double stitching. High stress thread is preferred to add strength and guard against blow outs.

Figure 3:
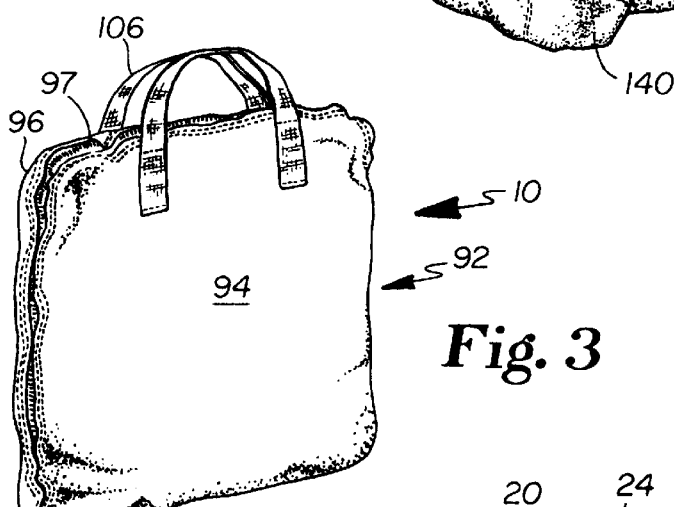
FIG. 3 shows a perspective view of the cover of FIG. 1 in the form of a bag with portions of the cover tucked inside the bag and with other portions of the cover forming the sidewall sections of the bag.

The cover 10 takes a cover form or a bag form. The form of a bag 92 is shown in FIG. 3. Bag 92 is generally formed by a pair of sidewall sections 94 and 96 of the seat sheeting portion. Sidewall section 94 is defined by a row of zipper teeth 98 which generally take the shape of a "C." Sidewall section 96 is defined by a row of zipper teeth 100 which generally take the shape of a "C." A zipper 97 engages or meshes zipper teeth 98 with zipper teeth 100 so as to draw the sidewall sections 94 and 96 together. Zipper teeth 94 and 96 extend from an inner surface or face 104 of sheeting 30 such that sidewall sections 94 and 96 form outside sidewalls of the bag 92. By viewing FIG. 5 which shows the outer face 90 of sheeting 30, it can be seen that a rolling or folding of cover 10 from edge portion 48 in the direction of the windshield 24 and beyond places most of the cover 10 on the inside of the bag 92, which then can be zippered up to contain the water, snow, ice, and dirt. Nylon handles 106 extend from the inner face 104 of cover 10, as shown in FIG. 4, and extend from the outer faces of the bag 92, as shown in FIG. 3. Nylon handles 106, extending from the inner face 104, are isolated from catching of objects. When cover 10 is turned inside out, it is even easier to roll the cover 10 onto the sidewall sections 94 and 96.

Sidewall sections 94 and 96 are integral with each other. Sidewall sections 94 and 96 are contained wholly within one portion of sheeting 30, specifically seat portion or panel 44. When on the snowmobile 12, sidewall sections 94 and 96 cover the snowmobile 12 and protect the snowmobile 12 from water, ice, snow and dirt. When in bag form, sidewall sections 94 and 96 prevent water, ice, snow and dirt from leaking out of the bag 92.

A handlebar opening 108 is formed by a zipper mechanism 110 in interior sheeting portion 42. Zipper mechanism 110 includes a zipper 112 and two respective rows 114 and 116 of cooperating zipper teeth. When cover 10 is on a generally flat surface, the opening 108, or more specifically, zippered rows 114 and 116, form generally the shape of a "U" with the "U" opening forwardly. Opening 108 includes a first end 118 and a second end 120. Preferably, the distance between the first and second ends 118 and 120 is at least the distance between the outer ends 22 of the handlebars 20 such that the handlebars 20 as a whole may extend from the opening 108. Zipper mechanism 110 preferably includes a pair of zippers 112, with each of the zippers 112 running from one of the ends 118, 120.

A perimeter 122 of the cover 10 includes edge portion 48 of hood sheeting portion 32, edge portions 58 of side sheeting portions 34 and 36, edge portions 60 of side sheeting portions 38 and 40, edge portions 78 and 82 of seat sheeting portion 44, and edge portion 86 of rear end sheeting portion 45. Such edge portions 48, 58, 60, 78, 82, and 86 are doubled back to form an endless sheath 124 for an endless elastic cord 126. Elastic cord 126 draws the perimeter 122 from a greater size to a lesser size and biases such perimeter 122 to such lesser size or closed position. Elastic cord 126 is one connector for fixing the cover 10 on the snowmobile 12. Bungee cord 76 is another connector for fixing the cover 10 on the snowmobile 12.

Elastic cord 126 and perimeter 122 form an opening 128. Cover 10 may be pulled through the opening 128 to turn the cover inside out or right side in. More preferably, after the snowmobile 12 (with cover 10 in place) has been towed or stored or has otherwise accumulated water, snow, ice and/or dirt, the cover 10 may be pulled off the snowmobile 12 by pulling the perimeter 122 outwardly and upwardly, stretching the elastic cord 126 about the cover 10 as a whole to turn the cover 10 inside out to trap water, snow, ice and dirt within the bowl shaped inside out cover 10. The exact opposite right side out bowl shaped cover 10 is shown in FIG. 4. The bowl or receptacle like shape is formed by virtue of the elastic cord 126. The inside out bowl shaped cover 10 may then be rolled up and tucked into bag or second receptacle 92 to further contain the water, snow, ice and dirt.

The perimeter 122 when on the snowmobile 10 is stretched beyond that shown in FIGS. 4 and 5. When the cover 10 is on the snowmobile 10, the perimeter 122 runs generally between the tips 18 of the skis 16, from the tips 18 of the skis 16 to the rear end of belt or drive 26, and along a rear end of belt or drive 26. Perimeter 122 is further stretchable beyond its position when on the snowmobile 10 so as to be stretched over the snowmobile 10. When the cover 10 is off the snowmobile 10, perimeter 122 retracts to the bowl or receptacle shape shown in FIGS. 4 and 5.

The cover 10 further includes a strap 130 and a buckle or loop 132. Passing the free end 134 of strap 130 through buckle 132 and drawing the free end 134 back toward the fixed end 136 draws an upper portion, specifically rear end sheeting portion 45 and seat sheeting portion 44 from a greater size to a lesser size. Strap 130 can then be fixed relative to buckle 132 to fix the sheeting portions 44 and 45 to the lesser size and tighter fit.

As shown in FIGS. 1, 2, 4 and 6, to minimize rupture or tearing of the sheeting 30 at the ski tip locations, reinforcement pieces 140 of sheeting are stitched to the inner surface 104 at each of the ski tip locations. Each of the reinforcement panels or pieces 140 preferably includes two separate portions, one of which is stitched to hood sheeting portion 32 and one of which is stitched to its respective side sheeting portion 34, 36. As shown in FIGS. 2, 4 and 6, to minimize rupture or tearing of the sheeting 30 at the strut locations, reinforcement panels or pieces 142 are stitched to the inner surface 104 at each of the strut locations, specifically to the inner surface of a middle portion of respective panels 34, 36. As shown in FIG. 6, to minimize rupture or tearing of the sheeting 30 at the ends or handles 22 of the handlebar 20, triangular reinforcement panels or pieces 144 are stitched to the inner surface 104 at each of the locations of the handles 22, specifically to the inside surface of panel 42 within the U-shape of the zipper mechanism 110. As shown in FIG. 6, panel 32 is two piece. One piece, panel 146, is double layered to minimize rupture or tearing of the sheeting 30 over the windshield 24. Double layered panel 146 includes edge portions 148, 150, 152 and 154.

A grommet 156 may be fixed in each of the respective panels 40 to permit the rubber band of the bungee cord 76 to pass therethrough or to permit the metal hook end of the bungee cord 76 to pass therethrough such that the metal hook end of the bungee cord 76 can engage a portion, such as the frame or underside, of the snowmobile 12. By engaging such a portion of the snowmobile 12, instead of the cover 10 or grommet 156 itself, the cover 10 is not lifted but remains pinched down on the snowmobile 12.

Among vehicles, a snowmobile is preferred. However, if desired, the present cover 10 may be used on all terrain vehicles or on passenger cars and trucks.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A cover for a snowmobile in combination with the snowmobile, with the snowmobile comprising a body, a pair of skis, handlebars to steer the skis, and a belt for biting into snow, with the snowmobile further comprising a length and a width, with the length being defined by a distance between a tip of a ski and a rear end of the body, with the cover comprising:
   a) sheeting having a length and a width, with the length and width of the sheeting being at least the length and width of the snowmobile such that the snowmobile is generally entirely covered by the sheeting;
   b) with the sheeting being resistant to the leakage of water therethrough such that, when the cover is on the snowmobile, the cover instead of the snowmobile accumulates water, snow, ice and dirt; and
   c) with at least a section of the sheeting being convertible from a cover form into a form of a receptacle, with the section of the sheeting being resistant to the leakage of water therethrough such that, as the section takes the form of the receptacle and as other portions of the cover are tucked into the receptacle, the water, snow, ice and dirt of the cover are collected in the receptacle to be disposed of at a proper time and place instead of being permitted to run off to soil an undesirable location.

2. The snowmobile cover according to claim 1, wherein the sheeting when in the cover form includes an outside face and an inside face, wherein the sheeting includes a closure for closing the receptacle when the sheeting is in the form of the receptacle, and wherein the closure is on the inside face of the sheeting such that the outside face having the water, snow, ice and dirt is rollable onto itself to trap the water, snow, ice and dirt and onto the section of the sheeting that converts to the form of a receptacle whereupon the closure is operated to close the receptacle and retain the water, snow, ice and dirt of the outside face therein.

3. The snowmobile cover according to claim 1, wherein the sheeting when in the form of a cover includes an outside face and an inside face, wherein the sheeting when in the form of a receptacle includes an outside face and an inside face, wherein the outside face of the receptacle forms a section of the inside face of the cover, and wherein the inside face of the receptacle forms a section of the outside face of the cover such that water, snow, ice and dirt on the outside face of the cover is readily brought into the receptacle and such that portions of the cover are readily drawn into the receptacle.

4. The snowmobile cover according to claim 1, wherein the sheeting comprises a perimeter, with the perimeter being biased inwardly toward itself to form an opening and such that the sheeting as a whole forms another receptacle, wherein the sheeting includes an outside face and an inside face, wherein the perimeter is expandable to turn the sheeting inside out such that the outer face becomes the inner face, and wherein when turned inside out the sheeting forms said another receptacle when off the snowmobile, whereby water, snow, ice and dirt can be first captured by turning the sheeting inside out and whereby water, snow, ice and dirt can be further captured by rolling up the cover and tucking the cover into the receptacle first mentioned.

5. The snowmobile cover according to claim 2, wherein the closure comprises a zipper.

6. The snowmobile cover according to claim 1, wherein the sheeting when in the receptacle form comprises a pair of sidewall sections, with the sidewall sections covering a portion of the snowmobile when the sheeting is in the form of a cover.

7. The snowmobile cover according to claim 6, wherein said portion of the snowmobile is a portion of a seat of the snowmobile.

8. The snowmobile cover according to claim 1, wherein the sheeting when in the cover form includes an outside face and an inside face, wherein the sheeting includes a handle for carrying the receptacle when the sheeting is in the form of the receptacle, and wherein the handle extends from the inside face of the sheeting when the sheeting is in cover form to minimize a catching of the handle on unintended objects.

9. A cover for a snowmobile in combination with the snowmobile, with the snowmobile comprising a body, a pair of skis, handlebars to steer the skis, and a belt for biting into snow, with the snowmobile further comprising a length and a width, with the length being defined by a distance between a tip of a ski and a rear end of the body, with the cover comprising:
   a) sheeting having a length and a width, with the length and width of the sheeting being at least the length and width of the snowmobile such that the snowmobile is generally entirely covered by the sheeting;
   b) with the sheeting being resistant to the leakage of water therethrough such that, when the cover is on the snowmobile, the cover instead of the snowmobile accumulates water, snow, ice and dirt; and
   c) a closeable opening in the cover and having two opposing portions, with the two opposing portions extending at least to outer ends of the handlebars to permit the handlebars to extend through the opening.

10. The cover according to claim 9 wherein the closeable opening forms when closed a general U-shape, with the "U" of the U-shape opening toward a front of the snowmobile.

11. A cover for a snowmobile in combination with the snowmobile, with the snowmobile comprising a body, a windshield, a pair of skis, handlebars to steer the skis, and a belt for biting into snow, with the snowmobile further comprising a length and a width, with the length being defined by a distance between a tip of a ski and a rear end of the body, with the cover comprising:
   a) sheeting having a length and a width, with the length and width of the sheeting being at least the length and width of the snowmobile such that the snowmobile is generally entirely covered by the sheeting;
   b) with the sheeting being resistant to the leakage of water therethrough such that, when the cover is on the snowmobile, the cover instead of the snowmobile accumulates water, snow, ice and dirt; and
   c) with the sheeting having a perimeter, with the perimeter being resiliently biased inwardly toward itself to form an opening through which the sheeting can be effectively pulled to turn the sheeting inside out such that an outside face of the sheeting becomes an inside face and such that water, snow, ice and dirt on the outside face can be trapped within the sheeting.

12. The cover according to claim 11 wherein the sheeting as a whole forms a shape of a first receptacle.

13. The cover according to claim 12, wherein the sheeting includes a second receptacle integral with the sheeting, wherein water, snow, ice and dirt are trapped in the first receptacle by turning the sheeting inside out, wherein water, snow, ice and dirt are further trapped in the second receptacle, and wherein the cover is compacted into the second receptacle.

14. The cover according to claim 11, wherein the perimeter comprises an endless sheath having an endless elastic cord housed therein.

15. A cover for a snowmobile in combination with the snowmobile, with the snowmobile comprising a body, a seat, an engine compartment, a hood over the engine compartment, a pair of skis, windshield, handlebars to steer the skis, and a belt for biting into snow, with the snowmobile further comprising a length and a width, with the length being defined by a distance between a tip of a ski and a rear end of the body, with the cover comprising:

a) sheeting having a length and a width, with the length and width of the sheeting being at least the length and width of the snowmobile such that the snowmobile is generally entirely covered by the sheeting;

b) with the sheeting being resistant to the leakage of water therethrough such that, when the cover is on the snowmobile, the cover instead of the snowmobile accumulates water, snow, ice and dirt; and c) with the cover being tailored to fit the lines of a snowmobile, wherein the sheeting comprises three sheeting portions, wherein the three sheeting portions comprise:
  i) an engine sheeting portion for generally snugly covering the engine compartment of the snowmobile;
  ii) a seat sheeting portion for generally snugly covering the seat of the snowmobile; and
  ii) a tent sheeting portion, disposed between the engine sheeting portion and the seat sheeting portion, for generally loosely covering the windshield and handlebars of the snowmobile.

16. The cover according to claim 15, wherein the engine sheeting portion comprises a pair of spaced apart engine side sheeting portions and a hood sheeting portion disposed between the spaced apart engine side sheeting portions.

17. The cover according to claim 15, wherein the tent sheeting portion comprises two spaced apart tent side sheeting portions and a ceiling sheeting portion disposed between the spaced apart tent side sheeting portions for extending over the handlebars and windshield of the snowmobile.

18. A cover for a snowmobile in combination with the snowmobile, with the snowmobile comprising a body, a pair of skis with struts and ski tips, handlebars to steer the skis, and a belt for biting into snow, with the snowmobile further comprising a length and a width, with the length being defined by a distance between a tip of a ski and a rear end of the body, with the cover comprising:

a) sheeting having a length and a width, with the length and width of the sheeting being at least the length and width of the snowmobile such that the snowmobile is generally entirely covered by the sheeting;

b) with the sheeting being resistant to the leakage of water therethrough such that, when the cover is on the snowmobile, the cover instead of the snowmobile accumulates water, snow, ice and dirt;

c) with the sheeting comprising a front end portion, with the front end portion confronting tips of the skis, with the front end portion comprising a double layer of sheeting where the front end portion confronts the tip of one ski and a double layer of sheeting where the front end portion confronts the tip of the other ski; and d) with the sheeting further comprising a side portion, with the side portion confronting the strut of each of the skis, with the side portion comprising a double layer of sheeting where the strut of one ski confronts the sheeting and with the side portion comprising another double layer of sheeting where the strut of the other ski confronts said sheeting at said side portion.

19. The cover according to claim 18, and the snowmobile further comprising a windshield and handles for the handlebars, with the sheeting further comprising a medial portion which in turn comprises double layers of sheeting for the windshield and the handles of the handlebars.

20. A cover for a snowmobile in combination with the snowmobile, with the snowmobile comprising a body, a seat, an engine compartment, a hood over the engine compartment, a pair of skis, windshield, handlebars to steer the skis, and a belt for biting into snow, with the snowmobile further comprising a length and a width, with the length being defined by a distance between a tip of a ski and a rear end of the body, with the cover comprising:

a) sheeting having a length and a width, with the length and width of the sheeting being at least the length and width of the snowmobile such that the snowmobile is generally entirely covered by the sheeting;

b) with the sheeting being resistant to the leakage of water therethrough such that, when the cover is on the snowmobile, the cover instead of the snowmobile accumulates water, snow, ice and dirt;

c) with the sheeting as a whole forming a receptacle via a retracting perimeter biased to be drawn inwardly toward itself so as to form a perimeter opening, with the cover being effectively pullable inside out through the perimeter opening to trap water, snow, ice and dirt inside of the perimeter opening in said receptacle; and d) with at least a section of the sheeting being convertible from a cover form into a form of another receptacle, with the section of the sheeting being resistant to the leakage of water therethrough such that, as the section takes the form of said another receptacle and as other portions of the cover are tucked into said another receptacle, the water, snow, ice and dirt of the cover are collected in said another receptacle to be disposed of at a proper time and place instead of being permitted to run off to soil an undesirable location;

e) a closeable opening in the cover and having two opposing portions, with the two opposing portions extending at least to outer ends of the handlebars to permit the handlebars to extend through the opening; and f) with the cover being tailored to fit the lines of a snowmobile, wherein the sheeting further comprises:
  i) an engine sheeting portion for generally snugly covering the engine compartment of the snowmobile;
  ii) a seat sheeting portion for generally snugly covering the seat of the snowmobile; and
  ii) a tent portion, disposed between the engine portion and the seat portion, for generally loosely covering the windshield and handlebars of the snowmobile.

* * * * *